(12) United States Patent
Wakiyama

(10) Patent No.: US 7,076,087 B2
(45) Date of Patent: *Jul. 11, 2006

(54) INDIVIDUAL IDENTIFYING APPARATUS AND METHOD

(75) Inventor: Kouji Wakiyama, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 704 days.

This patent is subject to a terminal disclaimer.

(21) Appl. No.: 10/179,158

(22) Filed: Jun. 25, 2002

(65) Prior Publication Data

US 2003/0058492 A1 Mar. 27, 2003

(30) Foreign Application Priority Data

Jun. 27, 2001 (JP) .......................... P. 2001-194814

(51) Int. Cl.
*G06K 9/00* (2006.01)

(52) U.S. Cl. ..................................... 382/117

(58) Field of Classification Search ................ 382/117, 382/115, 116; 340/5.52, 5.53, 5.8, 5.83, 340/5.78; 348/78; 356/71; 902/3, 6

See application file for complete search history.

(56) References Cited

U.S. PATENT DOCUMENTS

| | | | | |
|---|---|---|---|---|
| 5,016,282 A | * | 5/1991 | Tomono et al. | 382/117 |
| 5,784,145 A | * | 7/1998 | Ghodse et al. | 351/205 |
| 5,901,238 A | * | 5/1999 | Matsushita | 382/117 |
| 6,591,001 B1 | * | 7/2003 | Oda et al. | 382/117 |
| 6,762,794 B1 | * | 7/2004 | Ogino | 348/262 |
| 6,850,631 B1 | * | 2/2005 | Oda et al. | 382/117 |
| 6,873,714 B1 | * | 3/2005 | Witt et al. | 382/118 |
| 2002/0118864 A1 | * | 8/2002 | Kondo et al. | 382/117 |
| 2003/0002714 A1 | * | 1/2003 | Wakiyama | 382/117 |
| 2003/0011758 A1 | * | 1/2003 | Ochiai | 356/71 |
| 2003/0152252 A1 | * | 8/2003 | Kondo et al. | 382/117 |

FOREIGN PATENT DOCUMENTS

JP 9-212722 8/1997
JP 09-305816 11/1997

* cited by examiner

*Primary Examiner*—Joseph Mancuso
*Assistant Examiner*—Alex Liew
(74) *Attorney, Agent, or Firm*—Pearne & Gordon LLP

(57) ABSTRACT

While both a forehead and a cheek are made in close contact to an eye position fixing portion, a space defined between a left eye and a pinhole is shielded from extraneous light. When light derived from a room lighting device is entered into a right eye, a diameter of a pupil of the left eye is defined in a self-definition manner due to an interlocking characteristic of a living body, and then, a width of an iris 3 may be secured under stable condition. While infrared light is illuminated from a button lighting device onto this left eye, this illuminated left eye is photographed by an image pick up unit, and then, feature information as to the photographed left eye is compared with registered feature information in an individual identifying unit so as to execute an individual identification operation.

10 Claims, 8 Drawing Sheets

FIG. 6
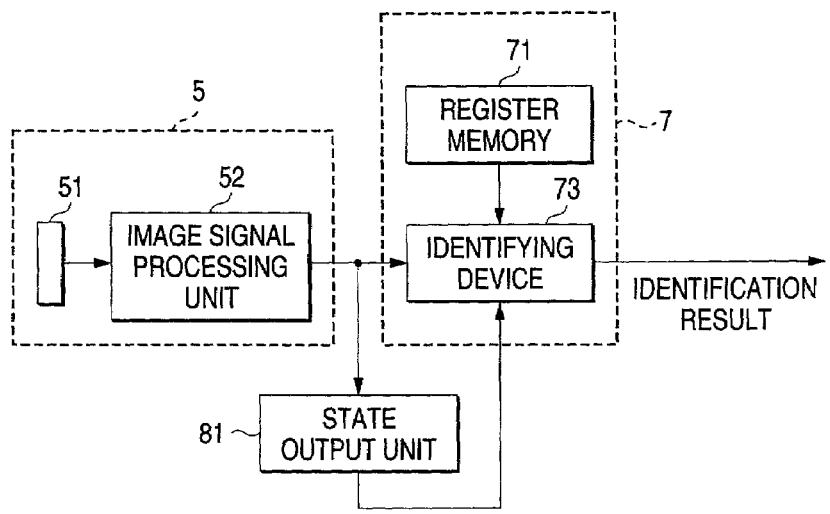
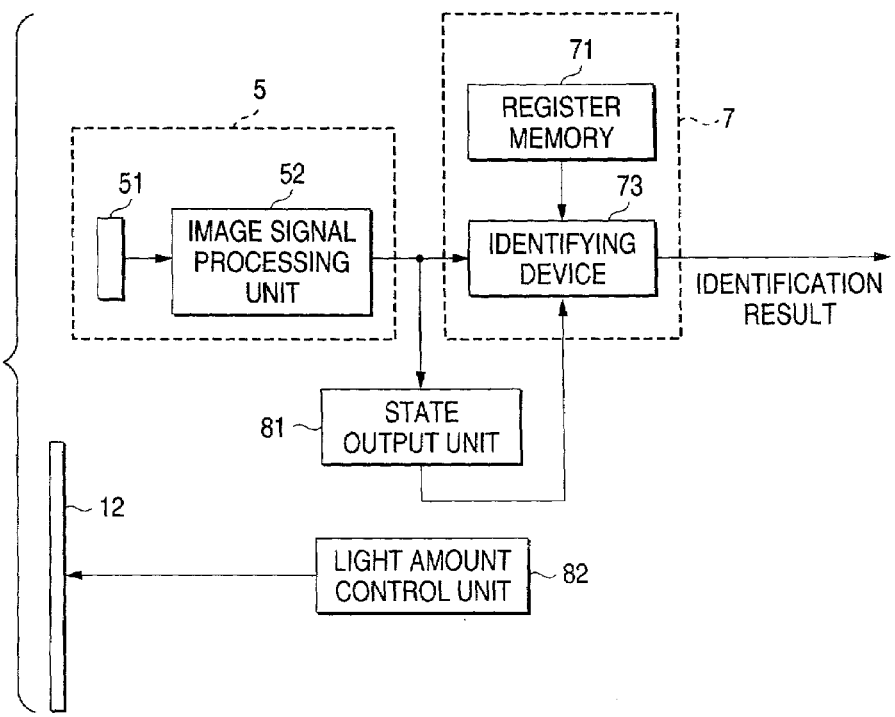
FIG. 7

INDIVIDUAL IDENTIFYING APPARATUS AND METHOD

BACKGROUND OF THE INVENTION

The present invention is related to an individual identifying apparatus for identifying as to whether or not a person to be identified is made coincident with a registered individual. More specifically, the present invention is directed to an individual identifying apparatus and an individual identifying method, for performing individual identification operation from an image obtained by photographing irides of eyes of the person to be identified.

Conventionally, individual identifying apparatus capable of identifying persons from one another by employing irides of eyes are known in this field. As an example of such individual identifying apparatus, one conventional individual identifying apparatus 100 disclosed in Japanese Patent Publication No. Hei. 9-212722 is indicated in FIG. 12. In this drawing, the individual identifying apparatus 100 is arranged by the pressure sensitive switch 101 for detecting presence of the person located in front of this individual identifying apparatus 100, the lighting device 102 for lighting the face and the eyes of the person, the camera 103 for photographing the iris portion of this person, the power control unit 104 for controlling turn-ON/OFF operations of the power supplies of the lighting device 102 and the camera 103, and the identifying unit 105 for executing the individual identification based upon the picture of the camera 103. When presence of the person is detected by the pressure sensitive switch 101, both the power supply of the lighting device 102 and the power supply of the camera 103 are turned ON by the power control unit 104, and then, the iris portion of the eye is photographed by the camera 103. The identifying unit 105 may confirm as to whether or not this photographed person is identical to the registered person based upon the image of this photographed iris portion.

In the above-described conventional individual identifying apparatus, the dimension of this individual identifying apparatus is increased, and also, the high-precision camera is necessarily required so as to photograph the iris portion from the long distance, and furthermore, the camera angle thereof should be positioned with high precision. As a result, there is such a problem that the manufacturing cost of this individual identifying apparatus becomes high. In addition, there is another problem that the individual identification by this individual identifying apparatus may be readily and adversely influenced by extraneous light, that is to say, when the iris portion is photographed, reflections may occur due to extraneous light, so that irides cannot be clearly photographed.

SUMMARY OF THE INVENTION

The present invention has been made to solve the above-described problem, and therefore, has an object to provide a low-cost individual identifying apparatus and a low-cost individual identifying method, capable of identifying individuals from one another without employing a high-precision camera, while a portability of this individual identifying apparatus is improved.

A first aspect of the present invention is featured by providing an individual identifying apparatus comprising: an image pick up unit for photographing either irides or retinas of eyes of a person to be identified; a position fixing unit for fixing a position of the image pick up unit, while extraneous light is interrupted under such a condition that one eye of the person to be identified is directed opposite to the image pick up unit; a first lighting unit for emitting photograph-purpose illumination light with respect to the one eye of the person to be photographed inside the position fixing unit; and an individual identifying unit for identifying an individual based upon a picture of the one eye which is photographed by the image pick up unit.

Also, a second aspect of the present invention is featured by that the individual identifying apparatus is further comprised of: a state output unit for outputting information corresponding to a pupil diameter of the one eye which is photographed by said image pick up unit; and the individual identifying unit identifies the individual based upon the picture of the one eye photographed by the image pick up unit when the output of the state output unit is reached to a predetermined value.

Also, a third aspect of the present invention is featured by that the individual identifying apparatus is further comprised of: a second lightening unit for emitting illumination light with respect to the other eye of the person to be identified so as to suppress widening of a pupil of the one eye of the person to be identified outside the eye position fixing unit.

Also, a fourth aspect of the present invention is featured by that the individual identifying apparatus is further comprised of: a light amount control unit for changing an amount of the illumination light of the second lighting unit.

Also, a fifth aspect of the present invention is featured by that the light amount control unit controls the light amount of the second lighting unit in such a manner that the output of the state output unit becomes a predetermined value.

Also, a sixth aspect of the present invention is featured by that the individual identifying apparatus is further comprised of: a second image pick up unit for photographing the other eye of the person to be identified; a second state output unit for outputting information corresponding to a pupil diameter of the other eye which is photographed by the second image pick up unit; and a second light amount control unit controls a light amount of the second lighting unit in such a manner that the output of the condition output unit becomes a predetermined value.

Also, a seventh aspect of the present invention is featured by that the individual identifying apparatus is further comprised of: an intermittent control unit for controlling at least one of the photographing operation by the image pick up unit, the light emitting operation by the first lighting unit, the light emitting operation by the second lighting unit, and the identifying operation by the individual identifying unit in an intermittent operation manner.

An eighth aspect of the present invention is featured by providing an individual identifying method comprising: an eye position fixing step for fixing a position of an image pick up unit, while interrupting extraneous light under such a condition that one eye of a person to be identified is directed opposite to the image pick up unit; a first lighting step for emitting photograph-purpose illuminating light with respect to the one eye of the person to be identified inside an eye position fixing unit for fixing a position of the one eye; a second lighting step for illuminating visible light with respect to the other eye of the person to be identified outside the eye position fixing unit; and an individual identifying step for identifying an individual based upon a picture of the one eye which is photographed by the image pick up unit under such a condition that the visible light illuminated in the second lighting step is entered into the other eye of the person to be identified.

A ninth aspect of the present invention is featured by providing a portable terminal comprising: a casing; a key pad provided on said casing; an image pick up unit provided within said casing to photographing one of irides and retinas of a one eye of a person through a hole provided on said key pad; a position fixing unit provided to surround said key pad and protrude from said casing to shield extraneous light when the one eye of the person is directed opposite to said image pick up unit; a first lighting unit provided in said key pad and emitting illumination light to photograph one of irides and retinas of the one eye of the person; and an individual identifying unit to identify an individual based on a picture of the one eye photographed by said image pick up unit.

A tenth aspect of the present invention is featured by providing the portable terminal further comprising a display provided on said casing and outside a region surrounded by said position fixing unit, and said display including a second lighting unit emitting illumination light with respect to the other eye of the person to suppress widening of a pupil of the one eye of the person.

Preferably, for instance, the first lighting unit for emitting the photograph-purpose illumination light with respect to one eye of the person to be identified is an infrared light emitting unit.

Also, the second lighting unit for emitting the visible light with respect to the other eye of the person to be identified is a room lamp. Alternatively, the second lighting unit is a light emitting display panel.

With employment of the above-described arrangement, while one eye of the person to be identified is interrupted, or shielded from the extraneous light and this one eye is fixed with being directed opposite to the image pick up unit, the photograph-purpose light emitted from the first lighting unit is irradiated onto this one eye under such a condition that the adverse influence caused by the extraneous light is eliminated, and then, this lightened eye is photographed. As a result, the iris of the eye can be clearly photographed, so that the individual identification operation can be carried out based upon the image of this photographed iris under stable condition. Also, the pupil diameter is adjusted by irradiating the visible light emitted from the second lighting unit to the other eye, and such an iris when the adjusted pupil diameter becomes a predetermined pupil diameter is photographed. As a result, the individual identification operation can be carried out with less error under more stable condition.

Also, since the eye of the person to be identified can be photographed within the short distance, such high-precision positioning operation of the image pick up unit is no longer required, and the compact individual identifying apparatus can be provided in low cost.

Furthermore, since the structural elements of the individual identifying apparatus are operated in the intermittent operation manner, power consumption of this individual identifying apparatus can be reduced.

BRIEF DESCRIPTION OF THE DRAWINGS

FIG. 6 is a block diagram for showing an arrangement of a major unit of an individual identifying apparatus according to a third embodiment of the present invention;

FIG. 7 is a block diagram for indicating a structure of a major unit of an individual identifying apparatus according to a fourth embodiment of the present invention;

DETAILED DESCRIPTION OF THE PREFERRED EMBODIMENT

Figure 1:
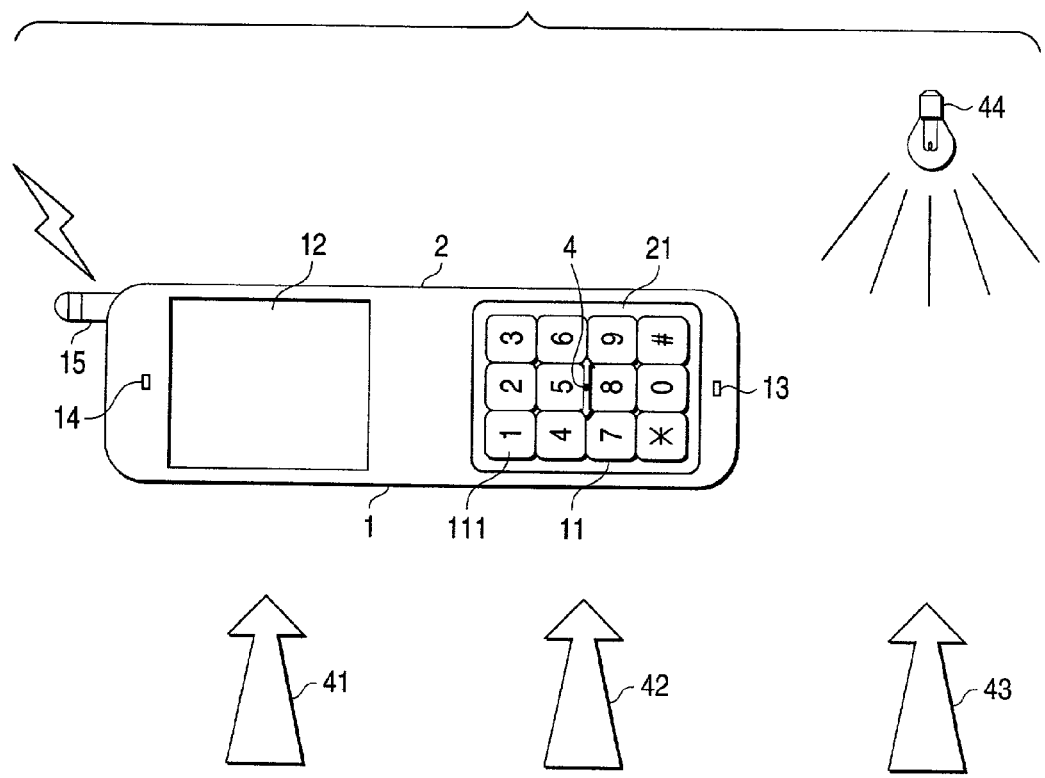
FIG. 1 is an explanatory diagrams for irradiating an outer view of an individual identifying apparatus, and a positional relationship of eyes, according to an embodiment of the present invention.

Referring now to drawings, embodiments of the present invention will be described. It should be understood that the same reference numerals are commonly employed as those for denoting the same, or similar structural elements in the respective drawings.

FIG. 1 is a diagram for illustratively showing both an outer appearance of an individual identifying apparatus 1 which is commonly used in a first embodiment to a seventh embodiment of the present invention (will be explained later), and also a positional relationship of eyes. In this drawing, the individual identifying apparatus 1 is provided with a ten-key (numeral enter key) unit 11, a light emitting display panel 12, a microphone 13, a speaker 14, and an antenna 15 in order that this individual identifying apparatus 1 may also own a function of a portable terminal. Then, while one of keys of the ten-key unit 11 includes a button lighting device 111, such a light emitting element for emitting infrared light, for instance, an infrared light emitting diode is built on a rear side of a key top made of light-transmitting resin. This button lighting device 111 may function as a first lighting unit of the present invention.

Also, a peripheral edge of the ten-key unit 11 of a casing 2 forms a convex shape, and constitutes an eye position fixing portion 21. While this eye position fixing portion 21 is depressed against either a forehead or a cheek of a person to be identified, eyes of this person are shielded from extraneous light, and also, the eye position fixing portion 21 is directed opposite to an image pick up element 51. A pinhole 4 is opened in a center portion of the eye position fixing portion 21 and also in a space of the ten-key unit 11, while this pinhole 4 is used to focus the eyes of the person to be identified onto the image pickup element 51. Furthermore, a battery (not shown) for supplying electric power, and an electronic circuit are built in the casing 2. This electronic circuit is used so as to realize various sorts of functions as a portable terminal, and also, an individual identification function (will be discussed later). Arrows 41, 42, 43 indicate such positions to which any one of right/left-sided eyes when an individual identification operation is carried out. A room lamp 44 corresponds to an illuminating light source installed within a room where an individual identifying work is performed. This room lamp 44 may function as a second lighting unit (will be discussed later) employed in both a first embodiment and a third embodiment of the present invention.

Embodiment 1

Figure 2:
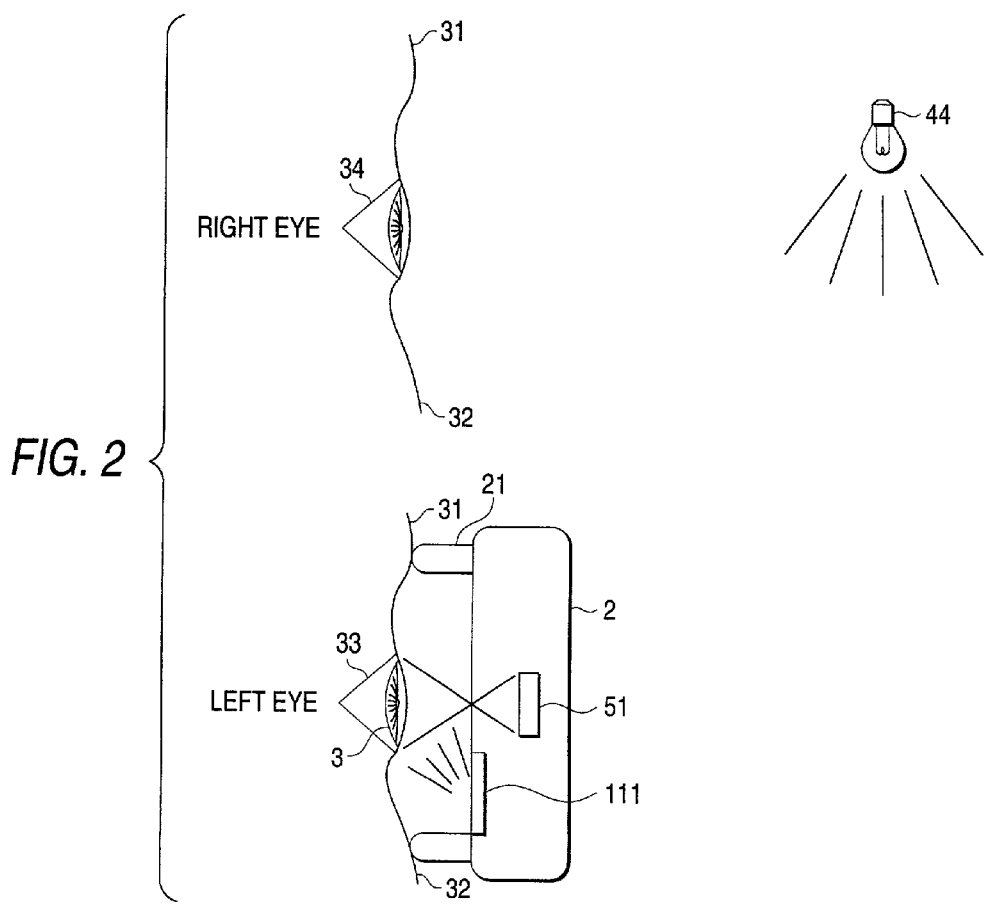
FIG. 2 is an explanatory diagram for showing a structure of an individual identifying apparatus under use state according to a first embodiment of the present invention.
Figure 3:
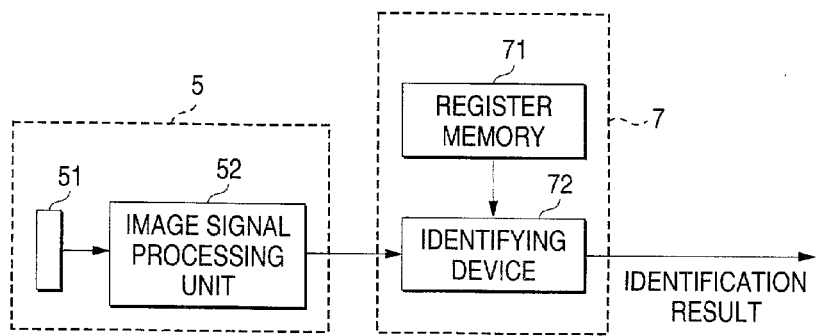
FIG. 3 is a block diagram for representing a structure of a major unit of the first embodiment.

FIG. 2 is an explanatory diagram for explaining a structure of an individual identifying apparatus 1 under use state, according to a first embodiment of the present invention. FIG. 3 is a block diagram for schematically showing an arrangement of a major unit of the individual identifying apparatus 1 according to the first embodiment. As to the apparatus structure of FIG. 2, there is shown a longitudinal sectional view at a position of the pinhole 4 of FIG. 1. An image pick up unit 5 is employed so as to photograph an iris 3 of a left eye 33. The image pick up unit 5 includes an image pick up element 51 and an image signal processing unit 52. The image pick up element 51 is a CCD image sensor having a sensitivity as to infrared rays. The image signal processing unit 52 performs a signal amplification, an A/D conversion, and other signal process operations. An individual identifying unit 7 executes individual identification operation based upon image information of the iris 3. This individual identifying unit 7 includes a register memory 71, and an identifying device 72. It should be noted that both the image pick up unit 5 and the individual identifying unit 7 are included in the casing 2.

As to the first embodiment of the present invention with employment of the above-described arrangement, operations thereof will now be explained.

First, while the respective units of the individual identifying apparatus 1 are operated, a left eye 33 of either a human being or an animal as a subject to be identified is approached toward the pinhole 4 at the position of the arrow 42 shown in FIG. 1. At this time, aright eye 34 of this subject to be identified is located at the position of the arrow 43, and extraneous light produced from the room lamp 44 corresponding to the second lighting unit of the present invention is entered into this right eye 34.

Subsequently, when either a forehead 31 or a cheek 32 is made in close contact with the eye position fixing portion 21, a space defined between the left eye 33 and the pinhole 4 is shielded with respect to the extraneous light. While the infrared light is entered into this left eye 33 from the button lighting device 111, since an eye of a person has no sensitivity as to infrared light, the left eye 33 may feel this condition as a dark scene and a pupil of this left eye 33 is tried to be widened(spread). However, since the extraneous light (visible light) is entered into the right eye 34, widening (spread) of the pupil may be suppressed, and a width of the iris 3 may be secured. If this iris 3 having such a width is illuminated by the infrared light emitted from the button lighting device 111, and then, the illuminated iris 3 is focused via the pinhole 4 onto the image pick up element 51 having the sensitivity of the infrared light, such a sharp image of both an shape and a pattern of this iris 3 can be acquired.

The following fact has been so far revealed. That is, there is a high interlocking (interconnection) characteristic as to a change in right and left pupils of a living body which may react in response to a light amount. For instance, in the case that a left eye of a living body feels that an incident light amount is small, when an amount of light entered into a right eye is increased, a pupils of the left eye is also changed in conjunction with the right eye. While the present invention utilizes this nature of the living body, a state of a pupil of the left eye 33 functioning as the subject to be identified may be defined in a self-definition manner in response to extraneous light entered into the right eye 34.

The image of the iris 3 is converted into an electric signal by the image pick up element 51, and thereafter, this electric signal is converted by the image signal processing unit 52 into such an image format which may be easily processed by the individual identifying unit 7.

While feature information as to irides to be identified has been previously stored in the register memory 71, the identifying device 72 compares feature information as to the iris 3 acquired based upon the output information derived from the image signal processing unit 52 with the feature information of the iris stored in the register memory 71. If a difference of these compared feature information is located within a predetermined range, then the identifying device 72 identifies that the checked iris 3 is made incident with the registered iris, and then, encrypts this identified result to output this encrypted result to an external appliance from a signal output terminal (not shown).

Furthermore, the signal of the identification result may be applied to such a security function by which a user of a portable terminal apparatus is specified based upon this identification result signal, and also, may be applied to various sorts of applications, for example, while an identification result is transmitted from the antenna 15 shown in FIG. 1, this identification result is operated as a key used when an external appliance is controlled.

As previously explained, in accordance with the first embodiment of the present invention, since the left eye 33 to be identified may define the dimension of the pupil thereof in a self-definition manner without being adversely influenced by the extraneous light, the compact individual identifying apparatus having the simple arrangement can be realized, by which the image of the iris can be photographed under stable condition.

Embodiment 2

Figure 4:
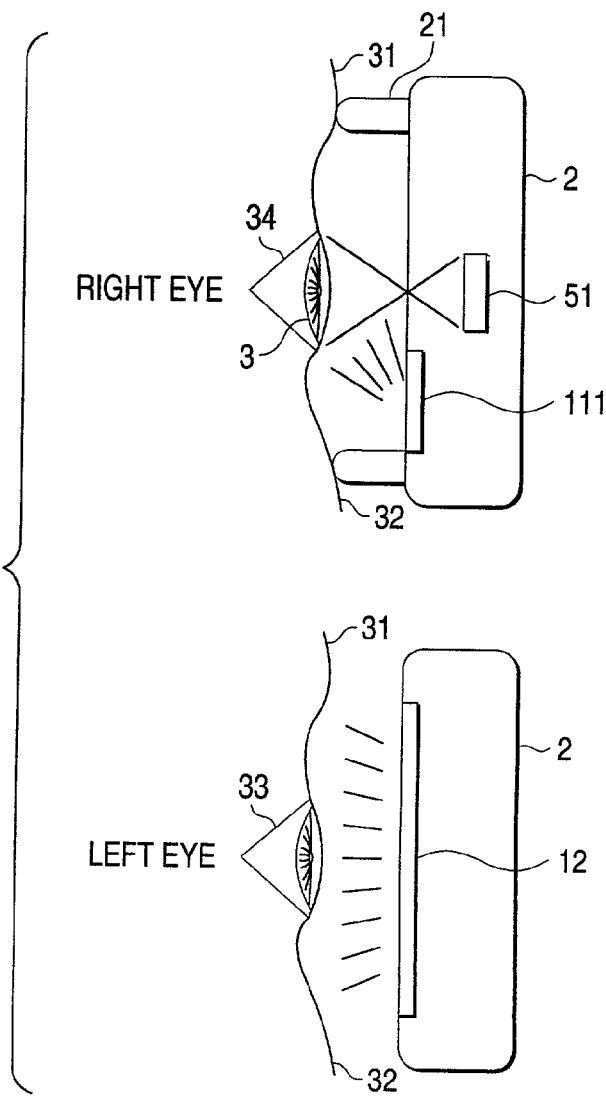
FIG. 4 is an explanatory diagram for showing an arrangement of an individual identifying apparatus under use state, according to a second embodiment of the present invention.
Figure 5:
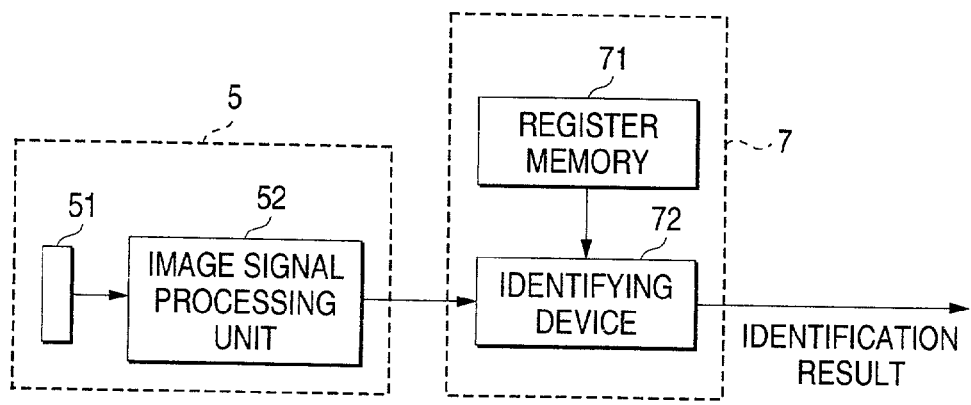
FIG. 5 is a block diagram for representing a structure of a major unit of the second embodiment.

FIG. 4 is an explanatory diagram for explaining a structure of an individual identifying apparatus 1 under use state, according to a second embodiment of the present invention. FIG. 5 is a block diagram for schematically showing an arrangement of a major unit of the individual identifying apparatus 1 according to the second embodiment. As to an apparatus structure of FIG. 4, there is shown a longitudinal sectional view at a position of the pinhole 4 and at a position of the light emitting display panel 12 of FIG. 1. The individual identifying apparatus 1 of the second embodiment includes the light emitting display panel 12 instead of the room lamp 44 shown in FIG. 2 as the above-explained second lighting unit in the first embodiment. It should be noted that the same reference numerals shown in FIG. 2 and FIG. 3 will be employed as those for indicating the same, or similar structural elements of FIG. 4 and FIG. 5 in this second embodiment, and explanations thereof are omitted.

Operations of the individual identifying apparatus with employment of the above-described arrangement, according to the second embodiment of the present invention, will now be described.

In the second embodiment, eyes of a subject to be identified own a reverse relationship with respect to those of the first embodiment. The right eye 34 is approached toward the pinhole 4 at the position of the arrow 42 shown in FIG. 1. At this time, the left eye 33 is located at the position of the arrow 41, and thus, light emitted from the light emitting display panel 12 corresponding to the second lighting unit is entered into this left eye 33.

When either the forehead 31 or the cheek 32 is made in close contact with the eye position fixing portion 21, a space defined between the right eye 34 and the pinhole 4 is shielded with respect to the extraneous light. As a result, even when the infrared light is irradiated onto this right eye 34 by the button lighting device 111, the right eye 34 may feel this condition as a dark scene and a pupil of this right eye 34 is tried to be widened. At this time, the light derived from the light emitting display panel 12 which is approached to the left eye 33 is entered into this left eye 33, as previously described in the first embodiment, widening (spread) of the pupil of the right eye 34 may be suppressed in accordance with the reaction characteristic of the living body by the light amount, and thus, a width of the iris 3 is secured. While the infrared light is irradiated onto the iris 3, both a shape and a pattern of this iris 3 can be clearly photographed.

As previously explained, in accordance with the second embodiment, since the light emitting display panel 12 is employed by being approached to the left eye 33 as the second lighting unit, the amount of the light entered into this left eye 33 which does not constitute the subject to be identified may become stable, as compared with that of the first embodiment, and also, the dimension of the pupil of the right eye 34 which constitutes the subject to be identified can be defined under more stable condition, so that the iris image can be photographed in high precision.

Embodiment 3

FIG. 6 is a block diagram for schematically indicating an arrangement of a major unit employed in an individual identifying apparatus 1 according to a third embodiment of the present invention. It should be understood that a structure of this individual identifying apparatus 1 under use condition is similar to that of the first embodiment shown in FIG. 2. The individual identifying apparatus 1 of the third embodiment includes a state output unit 81 in addition to the arrangement of the first embodiment shown in FIG. 2 and FIG. 3, and an identifying device 73 replaced with the identifying device 72 of the first embodiment shown in FIG. 2 and FIG. 3. The state output unit 81 outputs information corresponding to a pupil diameter of the left eye 33 photographed by the image pick up unit 5. The identifying device 73 executes the individual identification operation while using this information as a condition. It should be noted that the state output unit 81 is built in the casing 2 similar to both the image pick up unit 5 and the individual identifying unit 7. It should also be understood that the same reference numerals shown in FIG. 2 and FIG. 3 will be employed as those for denoting the same, or similar structures of FIG. 6, and explanations thereof are omitted.

As to the third embodiment of the present invention with employment of the above-described arrangement, operations thereof will now be described.

An image of an iris 3 of the left eye 33 is focused via the pinhole 4 onto the image pick up element 51. Then, the image of the photographed iris 3 is converted into an electric signal by the image pick up element 51, and thereafter, this electric signal is converted by the image signal processing unit 52 into such an image format which may be easily processed by the individual identifying unit 7. Then, this image format signal is supplied to the identifying device 73 and the state output unit 81.

The state output unit 81 outputs to the identifying device 73, such information corresponding to the photographed pupil diameter of the left eye 33. This identifying device 73 conducts feature information of the image signal processing unit 52 when the pupil diameter information supplied from the state output unit 81 may become an optimum condition with respect to an individual identification operation. Then, the identifying device 73 compares this conducted feature information of the iris 3 with the feature information of the iris to be identified which has been previously stored in the register memory 71, and thereafter, encrypts the identification result to output this encrypted identification result.

As previously explained, in accordance with the third embodiment, the iris information at such a time when the pupil diameter may become the optimum condition with respect to the individual identification can be acquired by the state output unit 81. As a consequence, precision of the individual identification operation can be improved.

Embodiment 4

FIG. 7 is a block diagram for schematically indicating an arrangement of a major unit employed in an individual identifying apparatus 1 according to a fourth embodiment of the present invention. It should be understood that a structure of this individual identifying apparatus 1 under use condition is similar to that of the second embodiment shown in FIG. 4. The individual identifying apparatus 1 of the fourth embodiment is arranged by adding a light amount control unit 82, and the state output unit 81 employed in the third embodiment shown in FIG. 6 to the arrangement of the individual identifying apparatus of the third embodiment shown in FIG. 6. The light amount control unit 82 controls a light amount of the light emitting display panel 12 provided in the second embodiment shown in FIG. 4 and FIG. 5. It should be understood that the same reference numerals shown in FIG. 4 to FIG. 6 will be employed as those for denoting the same, or similar structures of FIG. 7, and explanations thereof are omitted.

As to the fourth embodiment of the present invention with employment of the above-described arrangement, operations thereof will now be described.

When either the forehead 31 or the cheek 32 is made in close contact with the eye position fixing portion 21, a space defined between the right eye 34 and the pinhole 4 is shielded with respect to the extraneous light, and also, illuminating light emitted from the light emitting display panel 12, the light amount of which is controlled, is entered into the left eye 33 approached to the eye position fixing portion 21. As a result, the size of the pupil of the left eye 33 becomes a preselected dimension. As previously explained in the first embodiment, while widening of the pupil of the right eye 34 is suppressed under proper and stable conditions based upon the reaction nature of the living body caused by the light amount, a width of the iris 3 can be secured, so that a shape and a pattern of this iris 3 can be clearly photographed by irradiating thereon the infrared light.

On the other hand, the state output unit 81 outputs to the identifying device 73, such information corresponding to the photographed pupil diameter of the right eye 34. This identifying device 73 conducts feature information of the iris 3 in correspondence with the output information of the image signal processing unit 52 when the pupil diameter information supplied from the state output unit 81 may become an optimum condition with respect to an individual identification operation. Then, the identifying device 73 compares this conducted feature information of the iris 3 with the feature information of the iris to be identified which has been previously stored in the register memory 71, and thereafter, encrypts the identification result to output this encrypted identification result.

As previously explained, in accordance with the fourth embodiment, the light amount of the light emitting display panel 12 is controlled by the light amount control unit 82 so as to control the pupil diameter of the right eye 34 to become a predetermined dimension thereof, and further, the iris information at such a time when the pupil diameter may become the optimum condition with respect to the individual identification operation can be acquired by the state output unit 82. As a consequence, precision of the individual identification operation can be furthermore improved.

Embodiment 5

Figure 8:
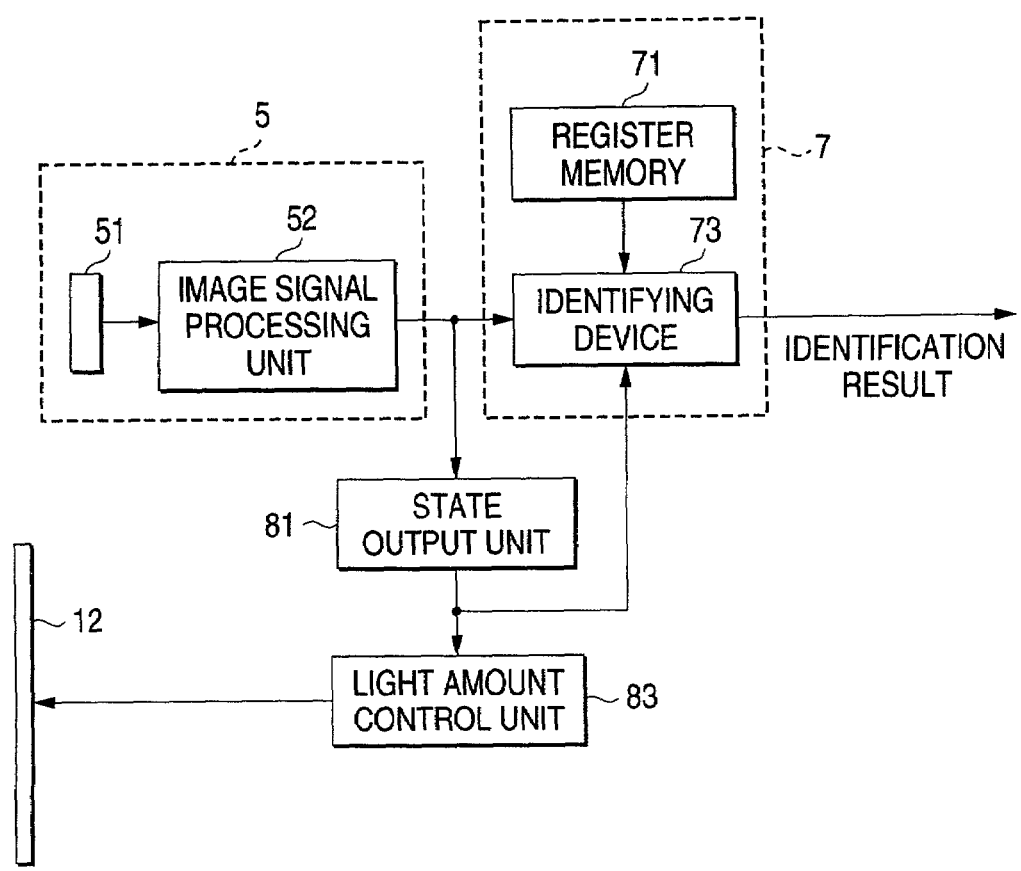
FIG. 8 is a block diagram for indicating a structure of a major unit of an individual identifying apparatus according to a fifth embodiment of the present invention.

FIG. 8 is a block diagram for schematically indicating an arrangement of a major unit employed in an individual identifying apparatus 1 according to a fifth embodiment of the present invention. It should be understood that a structure of this individual identifying apparatus 1 under use condition is similar to that of the second embodiment shown in FIG. 4. The individual identifying apparatus 1 of the fifth embodiment includes a light amount control unit 83 in the arrangement of the fourth embodiment shown in FIG. 7, while this light amount control unit 83 controls a light amount of the light emitting display panel 12 based upon an output of the state output unit 81. It should be noted that the light amount control unit 83 is built in the casing 2. It should be also understood that the same reference numerals shown in FIG. 7 will be employed as those for denoting the same, or similar structures of FIG. 8, and explanations thereof are omitted.

As to the fifth embodiment of the present invention with employment of the above-described arrangement, operations thereof will now be described.

The state output unit 81 produces information corresponding to the pupil diameter of the right eye 34, and then, outputs this produced information to both the identifying device 73 and the light amount control unit 83 similar to that of the fourth embodiment. The light amount control unit 83 controls a light amount of the light emitting display panel 12 based upon this information. The illumination light emitted from the light emitting display panel 12 is entered into the left eye 33. As a result, while widening (spread) of the pupil of the right eye 34 is suppressed based upon the reaction nature of the living body caused by the light amount, a width of the iris 3 may be secured, and also, both a shape and a pattern of the iris 3 may be clearly photographed by the image pick up unit 5. The state output unit 82 produces information in response to the iris diameter from the image of the photographed iris 3.

In accordance with this manner, such a control close loop including a portion of the living body may be formed from the light emitting display panel 12 via the left eye 33, the right eye 34, the image pick up unit 5, the state output unit 81, and the light amount control unit 83 to the light emitting display panel 12 in this sequence. As a consequence, the pupil diameter of the right eye 34 is correctly controlled to have a proper dimension, and both a shape and a pattern of the iris 3 can be more clearly photographed by the image pick up unit 5. Furthermore, since the iris information at such a time when the pupil diameter may become the optimum condition with respect to the individual identification operation can be acquired by the state output unit 82, precision of the individual identification operation can be highly improved.

Embodiment 6

Figure 9:
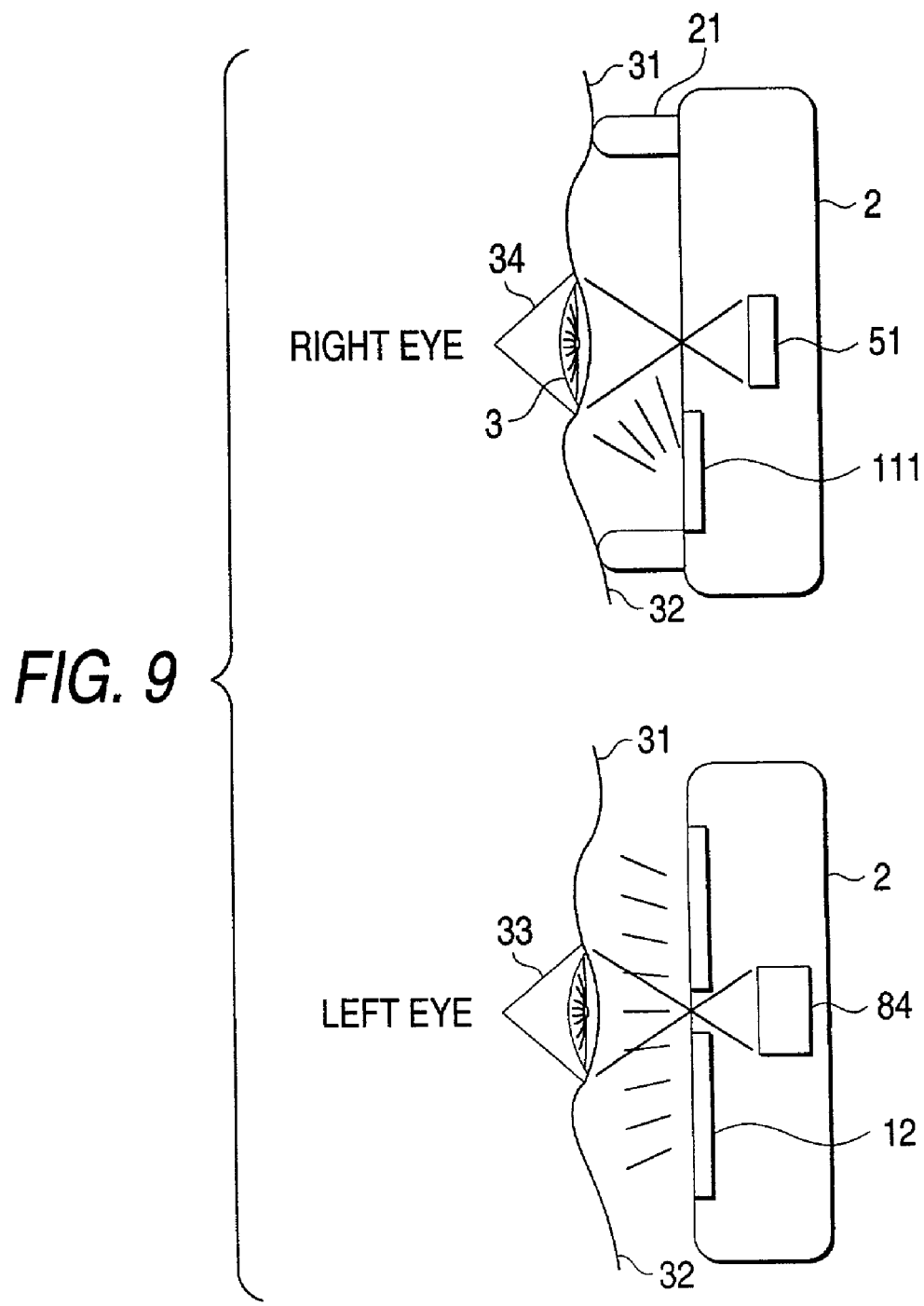
FIG. 9 is an explanatory diagram for showing an arrangement of an individual identifying apparatus under use state, according to a sixth embodiment of the present invention.
Figure 10:
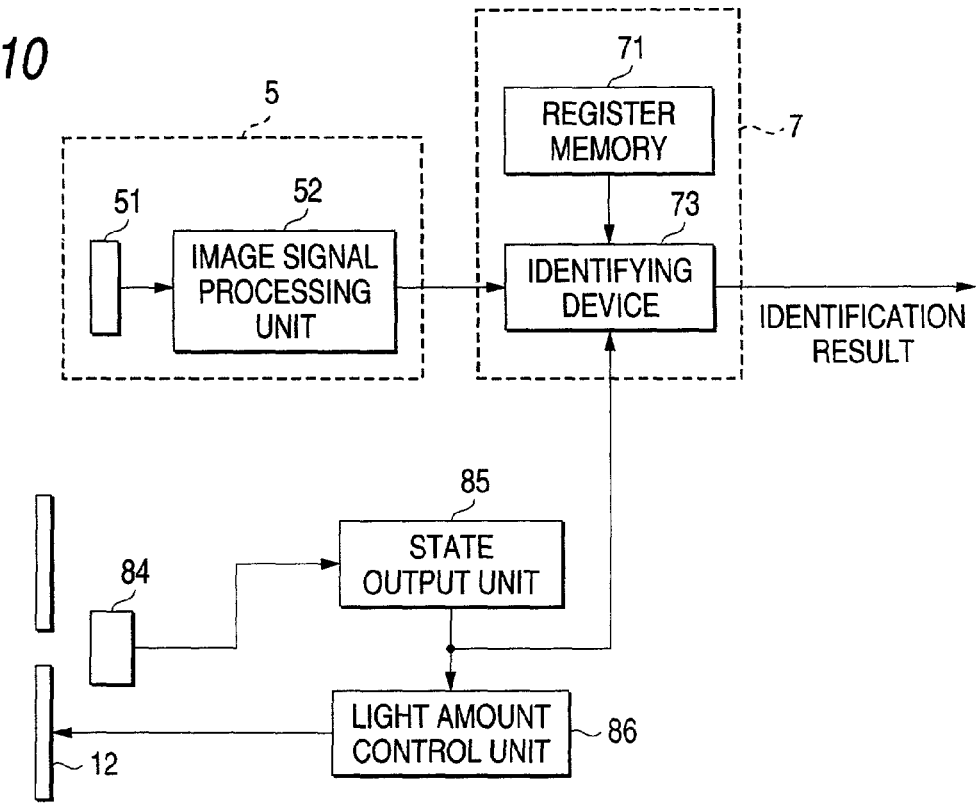
FIG. 10 is a block diagram for representing a structure of a major unit of the sixth embodiment.

FIG. 9 is an explanatory diagram for explaining a structure of an individual identifying apparatus 1 under use state, according to a sixth embodiment of the present invention. FIG. 10 is a block diagram for schematically showing an arrangement of a major unit of the individual identifying apparatus 1 according to the sixth embodiment. As to an apparatus structure of FIG. 9, there is shown a longitudinal sectional view at a position of the pinhole 4 and at a position of the light emitting display panel 12 of FIG. 1. The individual identifying apparatus 1 of the sixth embodiment includes such an image pick up element 84 as a CCD (charge-coupled device) image sensor similar to the above-described image pick up element 51 in order to photograph the left eye 33 which does not constitute a subject to be identified, while this image pick up element 84 is located at a back of the light emitting display panel 12 employed in the second embodiment shown in FIG. 4 and FIG. 5. The individual identifying apparatus 1 of the sixth embodiment also includes a state output unit 85 and a light amount control unit 86. The state output unit 85 outputs information corresponding to a pupil diameter of the left eye 33 photographed by the image pick up element 84. The light amount control unit 86 controls the light amount of the light emitting display panel 12 based upon this state output information. It should be noted that both the light amount control unit 86, and the state output unit 85 are built in the casing 2. It should be also understood that the same reference numerals shown in FIG. 4 and FIG. 5 will be employed as those for denoting the same, or similar structures of FIG. 9 and FIG. 10, and explanations thereof are omitted.

As to the sixth embodiment of the present invention with employment of the above-described arrangement, operations thereof will now be described.

The state output unit 85 produces information corresponding to the pupil diameter of the left eye 33, and then, outputs this produced information to both the identifying device 73 and the light amount control unit 86. The light amount control unit 86 controls a light amount of the light emitting display panel 12 based upon this information. The illumination light emitted from the light emitting display panel 12 is entered into the left eye 33. As a result, a diameter of the pupil of the left eye 33 is defined, and then, this defined diameter of the iris 3 is photographed by the image pick up element 85.

In accordance with this manner, such a control close loop may be formed from the light emitting display panel 12 via the left eye 33, the image pick up element 84, the state output unit 85, and the light amount control unit 86 to the light emitting display panel 12 in this sequence. As a result, the diameter of the pupil of the left eye 33 becomes a preselected dimension, and while widening of the pupil of the right eye 34 is suppressed based upon the reaction nature of the living body caused by the light amount, a width of the iris 3 can be secured to a predetermined value, so that a shape and a pattern of this iris 3 can be clearly photographed by the image pick up unit 5.

On the other hand, the output derived from the state output unit 86 is inputted into the identifying device 73. This identifying device 73 conducts feature information of the iris 3 of the right eye 34 in correspondence with the output information of the image signal processing unit 52 when the pupil diameter of the left eye 33 may become an optimum condition with respect to an individual identification operation. Then, the identifying device 73 compares this conducted feature information of the iris 3 with the feature information of the iris to be identified which has been previously stored in the register memory 71, and thereafter, encrypts the identification result to output this encrypted identification result.

As previously explained, in accordance with the sixth embodiment, since the pupil diameter of the left eye 33 which does not constitute the subject to be identified is controlled to become a preselected dimension, the iris 3 of the right eye 34 which constitutes the subject to be identified may have a predetermined width in conjunction therewith, so that such iris information suitable for the identification operation can be acquired. Furthermore, the iris information of the right eye 34 at such a time when the pupil diameter of the left eye 33 may become the optimum condition with respect to the individual identification operation can be acquired by the state output unit 85. As a consequence, precision of the individual identification operation can be furthermore improved.

Seventh Embodiment

Figure 11:
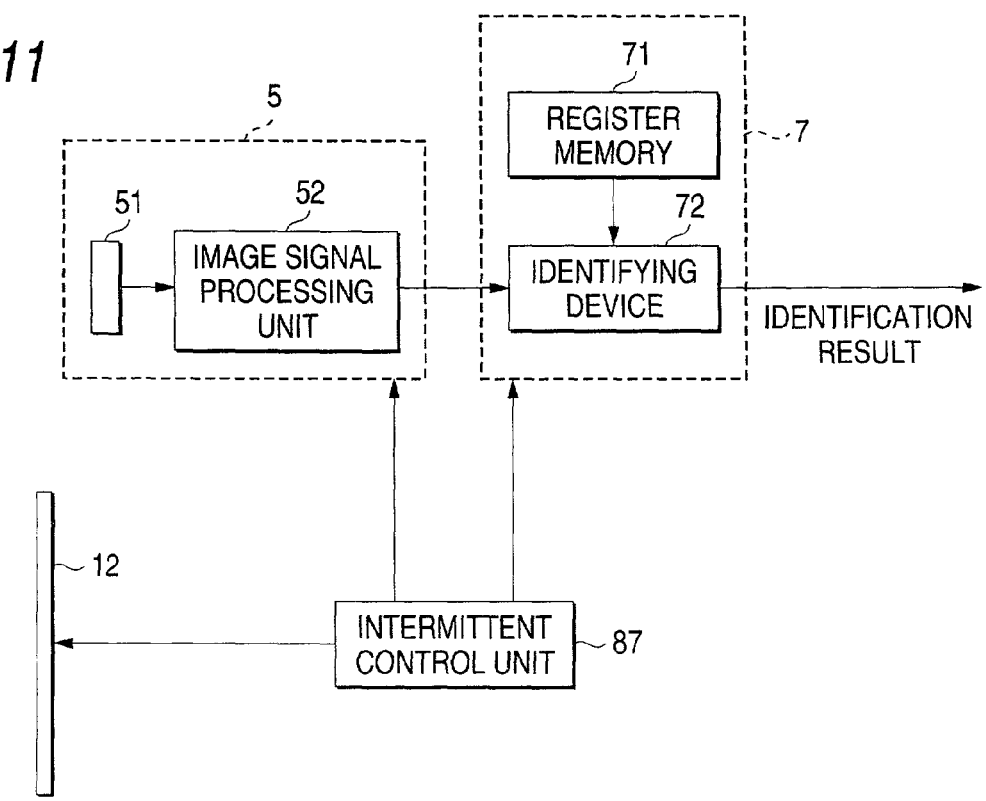
FIG. 11 is a block diagram for indicating a structure of a major unit of an individual identifying apparatus according to a seventh embodiment of the present invention.
Figure 12:
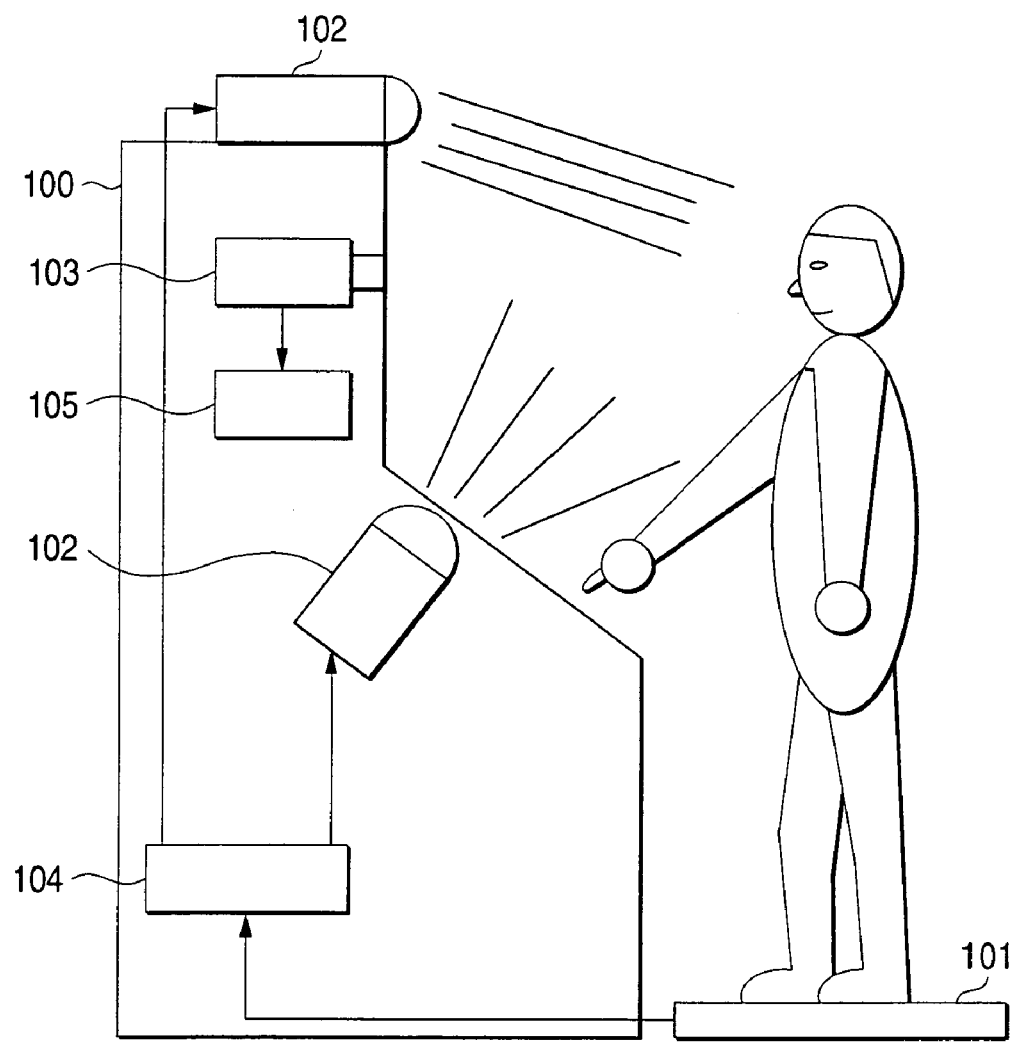
FIG. 12 is a diagram for showing the structural example of the conventional individual identifying apparatus.

FIG. 11 is a block diagram for schematically indicating an arrangement of a major unit employed in an individual identifying apparatus 1 according to a seventh embodiment of the present invention. It should be understood that a structure of this individual identifying apparatus 1 under use condition is similar to that of the second embodiment shown in FIG. 4. The individual identifying apparatus 1 of the seventh embodiment is arranged by newly employing an intermittent control unit 87 in the individual identifying apparatus of the second embodiment shown in FIG. 4 and FIG. 5, while this intermittent control unit 87 controls the image pick up unit 5, the individual identifying unit 7, the button lighting device 111, and the light emitting display panel 12 in an intermittent operation manner. It should be noted that the intermittent control unit 87 is built in the casing 2. It should also be understood that the same reference numerals shown in FIG. 4 and FIG. 5 will be employed as those for denoting the same, or similar structures of FIG. 11, and explanations thereof are omitted.

The intermittent control unit 87 controls input/output operations of signals as to the image pick up unit 5 and the individual identifying unit 7, so that the functions of the respective units can be intermittently operated, or intermittently stopped. Also, since the intermittent control unit 87 controls to drive the button lighting device 111 and the light emitting display panel 12, the light emitting operations of the light emitting display panel 12 can be controlled. Alternatively, this intermittent control unit 87 may ON/OFF-control a supply of electric power to the respective units, separately.

As previously described, in accordance with the seventh embodiment of the present invention, in addition to the above-described effect of the first embodiment, the operations defined from the image pick up operation of the iris 3 up to outputting of the individual identification result can be carried out in the intermittent manner. Furthermore, either a portion or all of power supplying operations under the control management is interrupted during a rest time period, so that reductions of power consumption can be improved.

It should be noted that in the descriptions of the first embodiment to the seventh embodiment, the iris is photographed as the information of the individual identification. Alternatively, even when a retina is photographed, the individual identifying operation of the present invention may be similarly carried out.

Also, such an example has been described. That is, one specific button employed in the ten-key unit 11 is indicated as the button lighting device 111 as the first lighting unit. Alternatively, even when anther button of the ten-key unit 11, plural buttons thereof, and furthermore, an exclusively-used lighting unit are employed, the first lighting unit may be similarly realized.

Also, such an example has been described. That is, the feature information as to the irides of the subject to be identified has been previously stored in the register memory 71. Alternatively, even when images obtained during registering operation are stored in this register memory 71, a similar effect may be achieved.

Also, such an example has been explained. That is, the pinhole 4 is employed to focus the iris image. Alternatively, a lens may be employed to focus the iris image.

As previously described in detail, in accordance with the present invention, while one eye corresponding to the subject to be identified is shielded from the extraneous light, the iris can be photographed under such a condition that the pupil diameter of one eye is defined by the light amount entered into the other eye. As a consequence, the individual identifying operation can be carried out in high precision under stable condition without being adversely influenced by the extraneous light. Also, while such a high-precision camera is not employed, the individual identifying operation can be carried out in high practical levels by the low-cost individual identifying apparatus having the superior portability, and also by the low-cost individual identifying method.

What is claimed is:

1. An individual identifying apparatus comprising:
an image pick up unit for photographing one of irides and retinas of a one eye of a person to be identified;
a position fixing unit for fixing a position of said image pick up unit, while extraneous light is shielded, under such a condition that the one eye of the person to be identified is directed opposite to said image pick up unit;
a first lighting unit for emitting photograph-purpose illumination light with respect to the one eye of the person to be photographed inside said position fixing unit;
an individual identifying unit for identifying an individual based upon a picture of the one eye which is photographed by said image pick up unit; and
a state output unit for outputting information corresponding to a pupil diameter of the one eye which is photographed by said image pick up unit,
wherein said individual identifying unit identifies the individual based upon the picture of the one eye photographed by said image pick up unit when the output of said state output unit is reached to a predetermined value,
wherein the image pick up unit is provided within a casing and photographs through a hole on a keypad provided on said casing, and
wherein the position fixing unit surrounds said keypad and protrudes from said casing.

2. An individual identifying apparatus comprising:
an image pick up unit for photographing one of irides and retinas of a one eye of a person to be identified;
a position fixing unit for fixing a position of said image pick up unit, while extraneous light is shielded, under such a condition that the one eye of the person to be identified is directed opposite to said image pick up unit;

a first lighting unit for emitting photograph-purpose illumination light with respect to the one eye of the person to be photographed inside said position fixing unit;

an individual identifying unit for identifying an individual based upon a picture of the one eye which is photographed by said image pick up unit; and a second lighting unit for emitting illumination light with respect to the other eye of the person outside said position fixing unit to suppress widening of a pupil of the one eye of the person.

3. The individual identifying apparatus as claimed in claim 2, further comprising a light amount control unit for changing an amount of the illumination light of said second lighting unit.

4. The individual identifying apparatus as claimed in claim 3, further comprising:

a state output unit for outputting information corresponding to a pupil diameter of the one eye which is photographed by said image pick up unit, wherein said light amount control unit controls the light amount of said second lighting unit so that the output of said state output unit becomes a predetermined value, wherein said individual identifying unit identifies the individual based upon the picture of the one eye photographed by said image pick up unit when the output of said state output unit is reached to the predetermined value.

5. The individual identifying apparatus as claimed in claim 2, further comprising:

a second image pick up unit for photographing the other eye of the person;

a second state output unit for outputting information corresponding to a pupil diameter of the other eye which is photographed by said second image pick up unit; and a second light amount control unit controls a light amount of said second lighting unit in such a manner that the output of said state output unit becomes a predetermined value, wherein said individual identifying unit identifies the individual based upon the picture of the one eye photographed by said image pick up unit when the output of said second state output unit is reached to the predetermined value.

6. The individual identifying apparatus as claimed in claim 2, further comprising an intermittent control unit for controlling at least one of the photographing operation by said image pick up unit, the light emitting operation by said first lighting unit, the light emitting operation by said second lighting, and the identifying operation by said individual identifying unit in an intermittent operation manner.

7. An individual identifying method comprising:

an eye position fixing step of fixing a position of image pick up unit, while shielding extraneous light under such a condition that a one eye of a person to be identified is directed opposite to said image pick up unit;

a first lighting step of emitting photograph-purpose illuminating light with respect to the one eye of the person to be identified inside an eye position fixing unit for fixing a position of the one eye;

a second lighting step of illuminating visible light with respect to the other eye of the person to be identified outside the eye position fixing unit to suppress widening of a pupil of the one eye; and an individual identifying step of identifying an individual based upon a picture of the one eye which is photographed by said image pick up unit under such a condition that the visible light illuminated in said second lighting step is entered into the other eye of the person to be identified.

8. A portable terminal comprising:

a casing;

a key pad provided on said casing;

an image pick up unit provided within said casing to photograph one of irides and retinas of one eye of a person to be identified through a hole provided on said key pad;

a position fixing unit provided to surround said key pad and protrude from said casing to shield extraneous light when the person is directed opposite to said image pick up unit;

a first lighting unit provided in said key pad and emitting illuminating light to photograph one of irides and retinas of the eye of the person;

an individual identifying unit to identify an individual based on a picture of the one eye photographed by said image pick up unit.

9. The portable terminal as claimed in claim 8, further comprising a display provided on said casing and outside a region surrounded by said position fixing unit, and said display including a second lighting unit emitting illumination light with respect to the other eye of the person to suppress widening of the pupil of the one eye of the person.

10. The portable terminal as claimed in claim 8, wherein said first lighting unit emits infrared light.

* * * * *